(12) United States Patent
Alqattan

(10) Patent No.: US 11,448,899 B1
(45) Date of Patent: Sep. 20, 2022

(54) CONTACT LENS SYSTEM AND METHOD FOR MONITORING OCULAR DISEASES

(71) Applicant: GIFTEDNESS AND CREATIVITY COMPANY, Safat (KW)

(72) Inventor: Bader A H A Alqattan, Safat (KW)

(73) Assignee: GIFTEDNESS AND CREATIVITY COMPANY, Safat (KW)

( * ) Notice: Subject to any disclaimer, the term of this patent is extended or adjusted under 35 U.S.C. 154(b) by 0 days.

(21) Appl. No.: 17/467,245

(22) Filed: Sep. 5, 2021

(51) Int. Cl.
*G02C 7/04* (2006.01)
*G02C 7/02* (2006.01)

(52) U.S. Cl.
CPC .............. *G02C 7/047* (2013.01); *G02C 7/021* (2013.01); *G02C 7/049* (2013.01)

(58) Field of Classification Search
CPC ......... G02C 7/047; G02C 7/021; G02C 7/049
USPC ...................................... 351/159.02
See application file for complete search history.

(56) References Cited

U.S. PATENT DOCUMENTS

| 9,021,110 B2 | 4/2015 | Lowe et al. | |
| 9,664,817 B1* | 5/2017 | Di Falco | G02B 1/002 |
| 2017/0140221 A1* | 5/2017 | Ollila | G02B 27/58 |

* cited by examiner

*Primary Examiner* — James R Greece
(74) *Attorney, Agent, or Firm* — Nath, Goldberg & Meyer; Richard C. Litman

(57) ABSTRACT

A contact lens system for monitoring ocular diseases includes a smart phone camera and a nanostructured contact lens. The nanostructures can cause visible color shifts from optical reflection in response to a physical surface curvature change of the contact lens. The physical surface curvature change of the contact lens can be detected by visible color shifts on a range of about 8° at normal room light. An embodiment of the contact lens can detect a change in the diffraction angle of light passing through the lens. A change in the diffraction angle can be correlated with can indicate a change in a hydration level of the ocular surface and/or $K^+$ ion concentration change.

13 Claims, 24 Drawing Sheets

CONTACT LENS SYSTEM AND METHOD FOR MONITORING OCULAR DISEASES

BACKGROUND

1. Field

The disclosure of the present patent application relates to eye monitoring devices, and particularly, to a contact lens system and method for monitoring ocular diseases.

2. Description of the Related Art

Delayed or infrequent eye examinations can result in ocular diseases causing irreversible damage in the form of vision impairment or blindness. To avoid this damage, the pressure in a patient's eyes should be frequently monitored, as excessive pressure is often related to an underlying ocular disease, such as glaucoma. In addition, other indicators of disease should also be monitored, such as the moisture and positive potassium ion levels of the eye. As technology for this type of monitoring has traditionally only been available in an optometrist's office, many patients have been unable to obtain an appropriate level of eye care.

Thus, a contact lens system and method for monitoring ocular diseases solving the aforementioned problems is desired.

SUMMARY

A contact lens system for monitoring ocular diseases includes a handheld computer device, e.g., a smart phone, and a nanostructured contact lens. Nanostructures defined in the contact lens can cause visible color shifts from optical reflection in response to a physical surface curvature change of the contact lens. The visible color shifts can be detected by the camera of the handheld computer device at normal room light. A change in the physical surface curvature change of the contact lens can be correlated with the visible color shifts. An embodiment of the contact lens can include an illumination source and light sensor to detect a change in the diffraction angle of light passing through the lens. A change in the diffraction angle can be correlated with a change in a hydration level of the ocular surface and/or $K^+$ ion concentration change.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
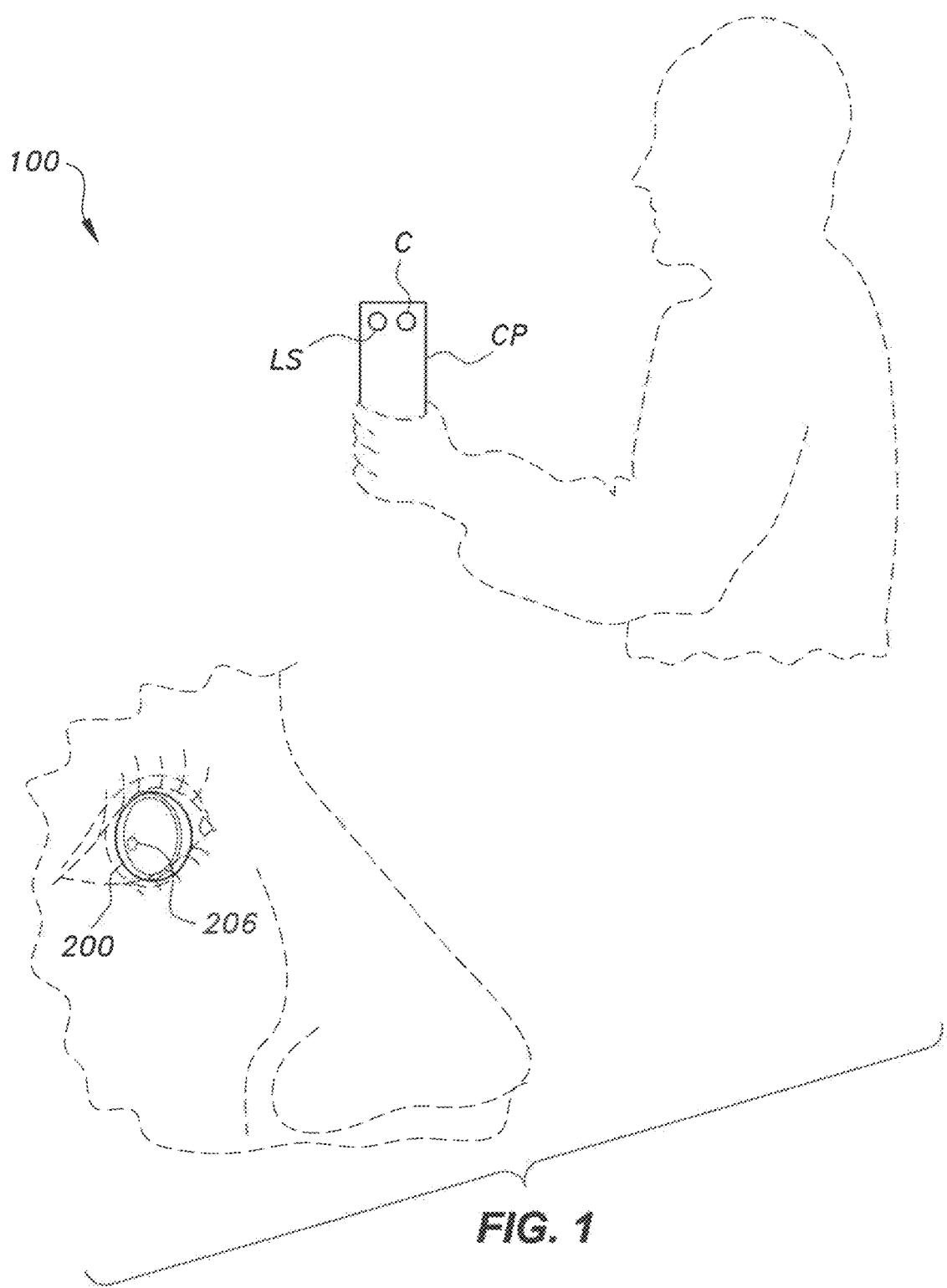
FIG. 1 is an environmental, perspective, view of a contact lens system for monitoring ocular diseases.

A contact lens system for monitoring ocular diseases 100 is shown environmentally in FIG. 1. The contact lens system shown includes a smart phone camera CP and a nanostructured contact lens 200 configured for positioning on the ocular surface. Although a smart phone camera CP is shown, it should be understood that any suitable camera configured for detecting and computing optical reflection from the ocular surface can be used. The nanostructured contact lens 200 can include curved nanostructures 206 and can have a size of about 840 nm. It should be understood that the circular shape identified as 206 in the drawings is simply representative of a plurality of curved nanostructures and is not intended to convey the shape of an actual curved nanostructure. The nanostructures 206 can be formed using a neodymium-doped yttrium aluminum garnet laser (1064 nm, 24 mJ). In an embodiment, the lens 200 is a hydrogel lens. The nanostructures can cause visible color shifts from optical reflection in response to a physical surface curvature change of the contact lens 200. For example, the physical surface curvature change of the contact lens 200 can be detected by visible color shifts on a range of about 8° at normal room light. In an embodiment, RGB (red, green, blue) colorimetric values from the color shift can be determined by the smartphone camera or other suitable device.

Figure 2:
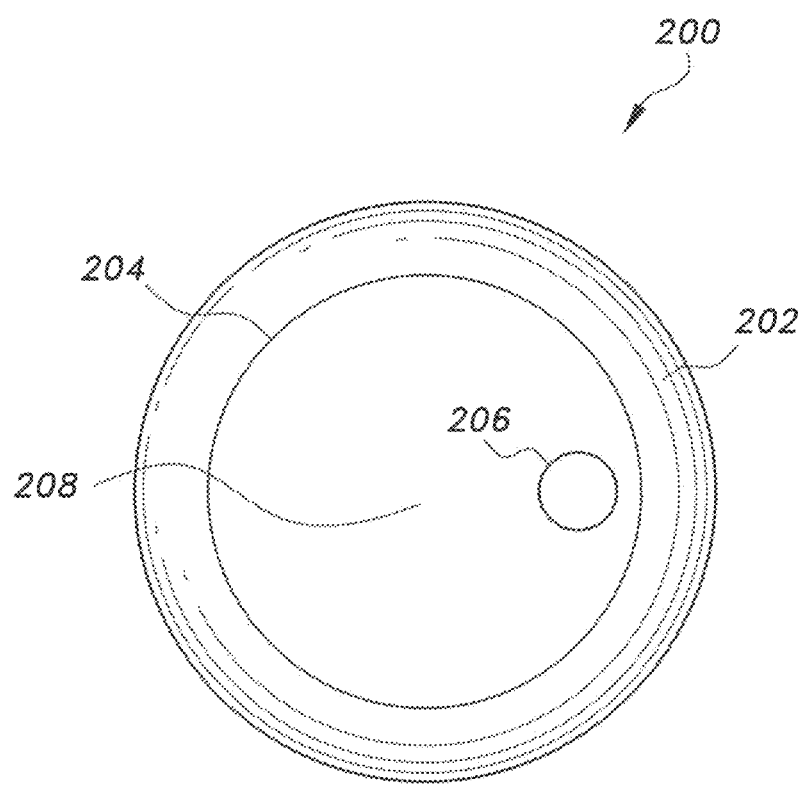
FIG. 2 is a diagram of a first embodiment of a contact lens for use in the contact lens system of FIG. 1.

As shown in FIG. 2, the lens 200 can have a first thickness corresponding to a first or inner most portion of the lens 208, a second thickness corresponding to a second or an outer portion of the lens 202, and a third thickness corresponding to a third or mid-portion 204 between the central portion 208 and the outer portion 202. The third thickness can be less than the second thickness and greater than the first thickness. In an embodiment, the first thickness is about 85 µm, the third thickness is about 120 µm, and the second thickness is about 185 µm.

In an embodiment, the curved nanostructures 206 can have a 1D or 2D grating nanopattern. In an embodiment, the curved nanostructures can have a 1D nanopattern created on a contact lens through direct laser interference patterning (DLIP) in holographic Denisyuk reflection mode. The nanostructures can be formed using a neodymium-doped yttrium aluminum garnet (Nd:YAG) laser, as described in detail below.

Figure 3:
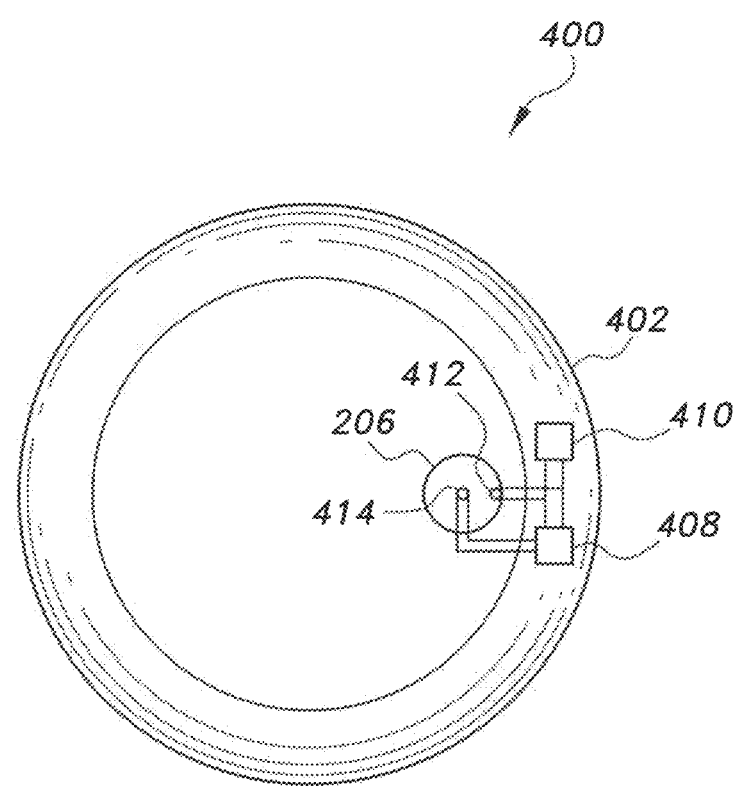
FIG. 3 is a diagram of a second embodiment of a smart contact lens for use in the contact lens system of FIG. 1.

An embodiment of the contact lens, designated 400 in FIG. 3, includes a thin micro battery 410 and microchip 408 embedded in the outer portion of the contact lens 400. The curved nanostructures 206 of the contact lens 400 can be patterned along the mid-portion 204 of the lens 400. A micro/nano LED 412 with red illumination or other illumination source can be positioned proximate a portion of the nanostructures 206 along the mid-portion and connected to the micro battery 410. A light receiver or sensor 414 can be positioned along the outer most portion and connected to the LED 412 to measure the change in diffraction angle. The microchip 408 can send a signal to a smart phone, smart watch, or other any handheld computer device configured to receive signals from the microchip 408 and communicate changes in diffraction or reflection to a user. All computations can be done within the contact lens 400 and transmitted remotely to the smart phone, smart watch, or other handheld device. The curved nanostructures 206 that are associated with the illumination source can occupy a total area of about 2 mm to about 2.5 mm of the lens 400, while the receiver 414 and the micro red LED 412 (or other illumination source) can be about 50 µm each in size. The remaining curved nanostructures 206 can be used for detecting color shifts resulting from physical surface curvature changes of the contact lens. For example, the RGB colorimetric values from the color shifts of optical reflection from the nanostructures can be quantitatively identified by a smartphone camera having RGB detection software.

When the contact lens 400 is exposed to ambient humidity and fully-hydrated environments, the nanostructures cause a change in the diffraction angle of light passing through the lens 400. For example, on a fully-hydrated contact lens, the nanostructures can provide a 4° diffraction angle difference. The nano-patterned structures can also be responsive to $K^+$ concentration levels, e.g., of about 12 mmol $L^{-1}$ sensitivity, that may allow for detecting ocular ion strength changes. A pre-determined diffraction angle difference can indicate a change in a hydration level of the ocular surface and/or $K^+$ ion concentration change. These changes can be correlated with an ocular condition or indicate to the patient to have further tests done to determine an underlying cause.

The micro battery 410 provides the necessary power for the microchip 408, the red micro-LED 412 and the light sensor 414. In operation, the red micro-LED shines light on the curved nanostructures 206, which diffracts and modifies the light. The diffracted light from the LED can be received by the light sensor 414, which transmits an electrical signal to the microchip 408. The microchip includes software for determining the diffraction angle difference. The microchip can include an internal wireless communication module (Wi-Fi) to transmit the data to a smart watch, cell phone or other portable electronic device.

Figure 4:
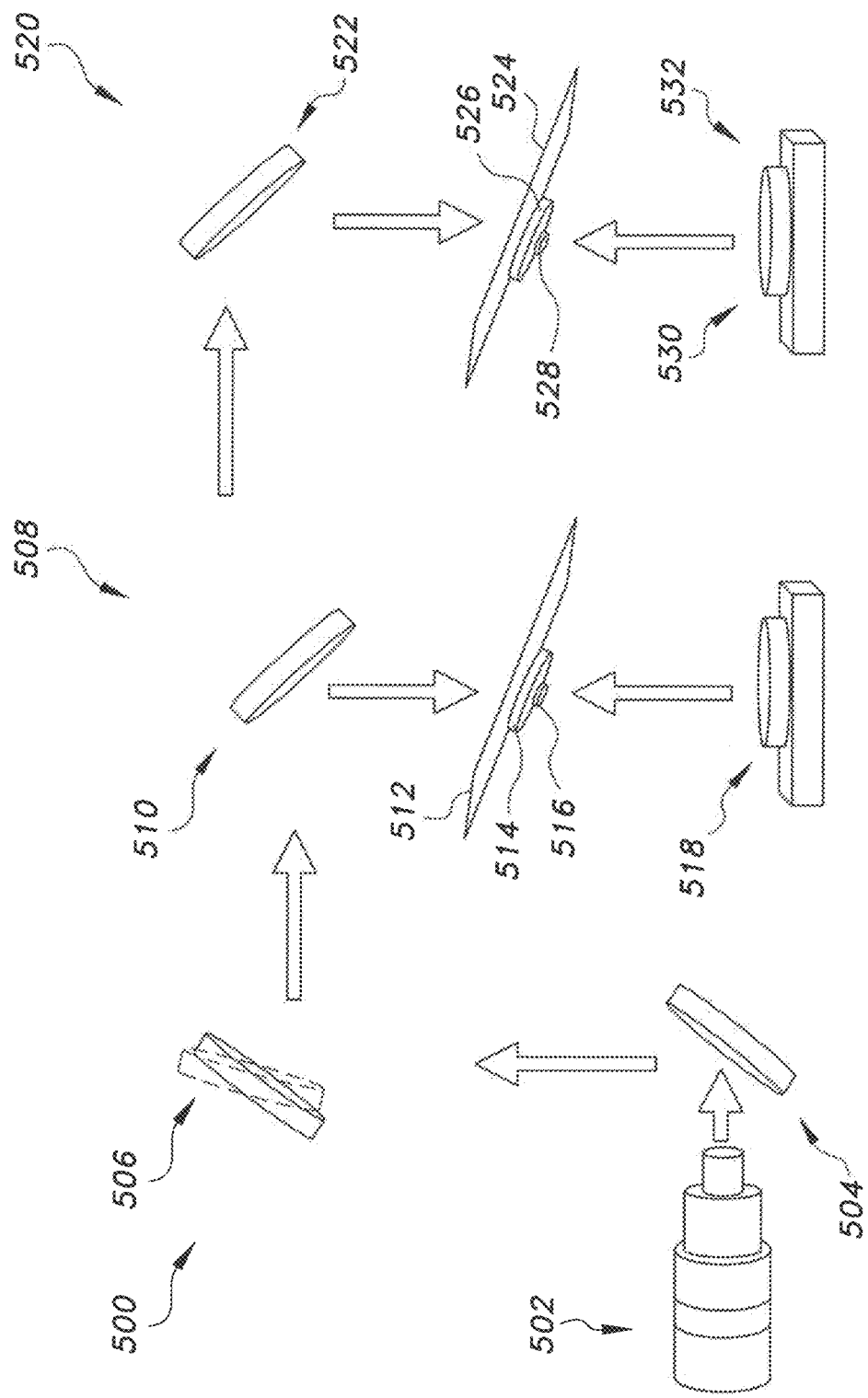
FIG. 4 is a diagram of a system for making the curved nanostructures for the contact lens.

A diagram of a system for making the 1D, 2D and holographic nanopatterns 500 using direct laser interference patterning (DLIP) in holographic Denisyuk reflection mode is shown in FIG. 4. An Nd:YAG laser 502 directs a laser beam toward a dielectric mirror 504. In one embodiment, the laser 502 is operated at 1064 nm and 240 mJ in 3.5 ns pulses. The reflected laser light from the dielectric mirror 504 is directed to a first planar moveable mirror 506. The reflected laser light from the first planar moveable mirror 506 is directed to a first system 508 including a second planar mirror 510. Second planar mirror 510 may be half mirrored, such that half the laser light is transmitted to the first system 508 and half of the laser light is transmitted to a second system 520. The laser light from the second planar mirror 510 is directed toward a tilted glass support plate 512. A contact lens 514 is mounted on the glass support plate 512 and includes a black dye film 516 positioned on the contact lens 514. The laser light reflected from mirror 510 passes through the black dye film 516 to a third planar mirror 518 and is reflected back from the third planar mirror 518 to ablate localized regions in the contact lens 514, thereby forming the desired nanostructure. Laser light in the second system 520 is similarly passed through a tilted glass support plate 522 that includes contact lens 526 and black dye film 528. The light passes to edge 532 of concave mirror 530 and is reflected back to ablate corresponding positions of the contact lens 514 to provide the nanostructured contact lens.

Figure 5:
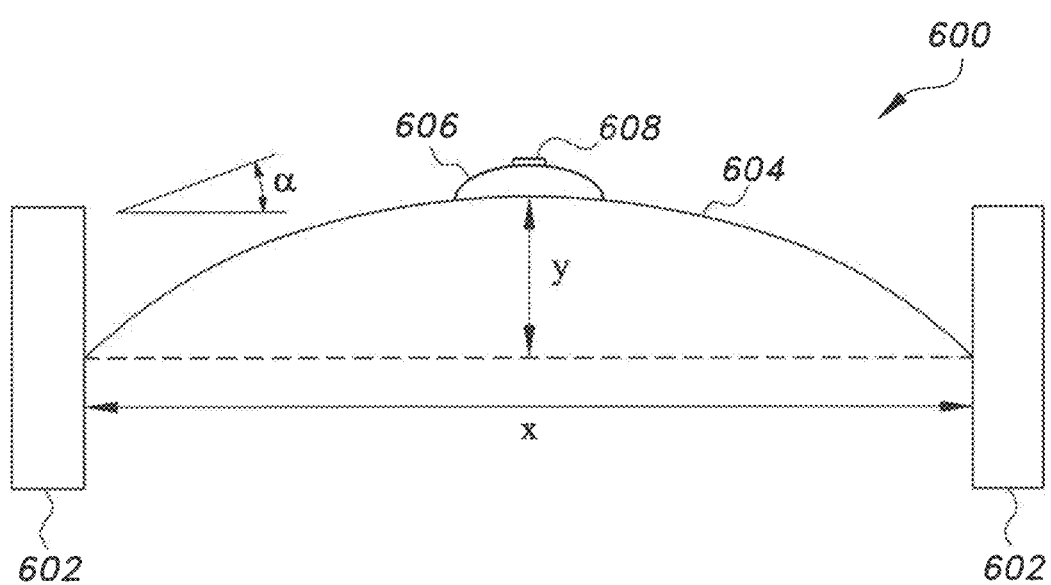
FIG. 5 is a side view of a jig for bending the contact lenses of FIGS. 2 and 3.

The nanostructured contact lens 514 was subject to bending experiments to simulate the change of ocular surface radius in different environmental conditions. FIG. 5 shows a side view of a jig 600 for bending the nanostructured contact lens. The jig 600 includes sidewalls 602 separated by a distance X with a sheet of flexible plastic 604 extending between the sidewalls 602. A nanostructured contact lens 606 is mounted on the flexible sheet 604 at its approximate center. One or more of the sidewalls 602 may be moveable toward and away from each other, to change horizontal distance X, vertical distance Y, and the bending angle α of the flexible sheet 604. In experiment, visible specific color shifts on a range of 8° at normal room light associated with the physical surface curvature changes of the contact lens was observed. The RGB colorimetric values from the color shifts of optical reflection from the nanostructures were quantitatively identified by a smartphone camera.

Figure 6:
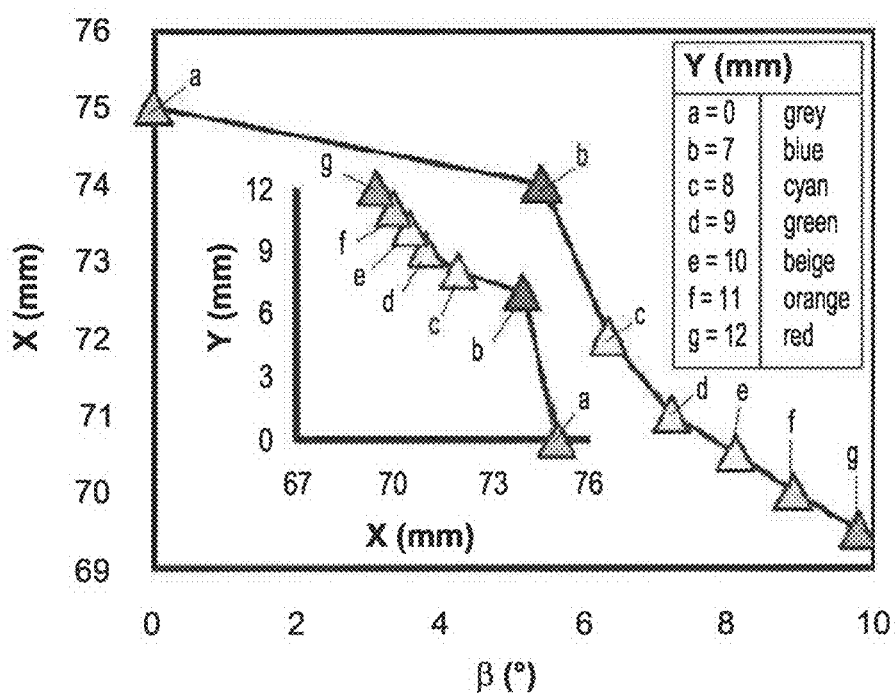
FIG. 6 is a graph of the change in distance and the change in 1st order diffraction spot angle β of an exemplary nanostructured contact lens (the inset graph shows the relationship between the change in the horizontal distance X and the corresponding change in vertical distance Y).
Figure 7:
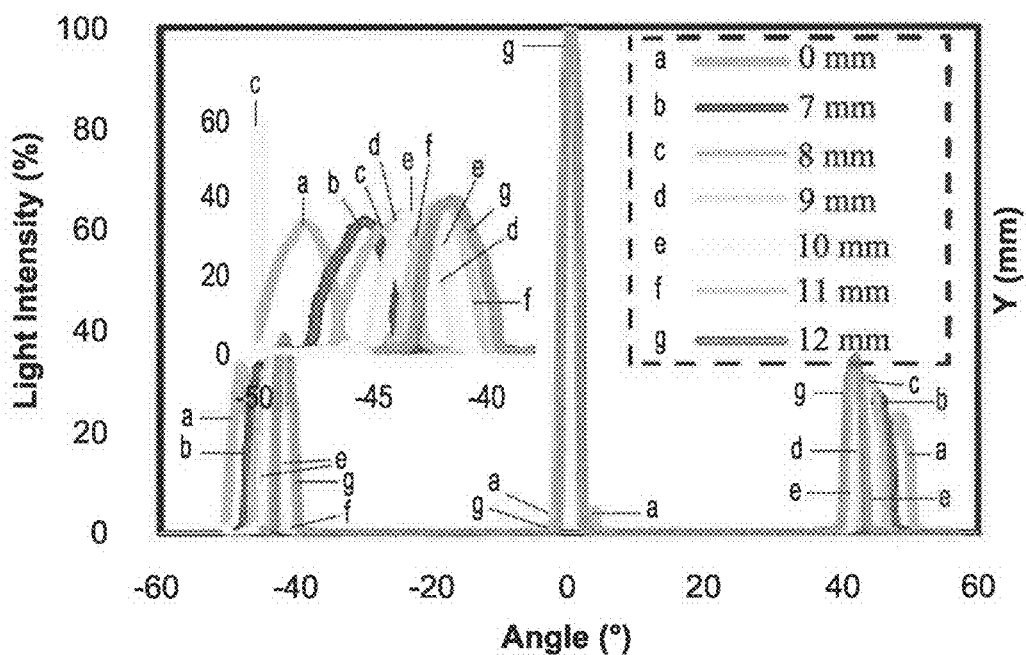
FIG. 7 is a graph showing the intensity increase with bending the contact lens in ambient humidity and fully-hydrated conditions (the inset is an enlargement of the data graphs between −50 and −40 degrees of diffraction).
Figure 8:
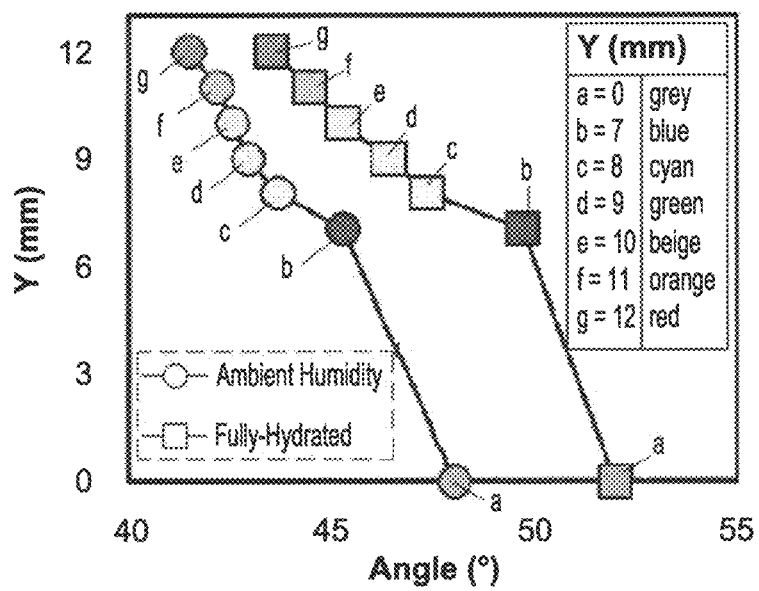
FIG. 8 is a graph of the bending distance change (change in distance Y) and the corresponding change in the diffraction spot angle of the nanostructured contact lens for both ambient humidity and fully hydrated conditions.
Figure 9:
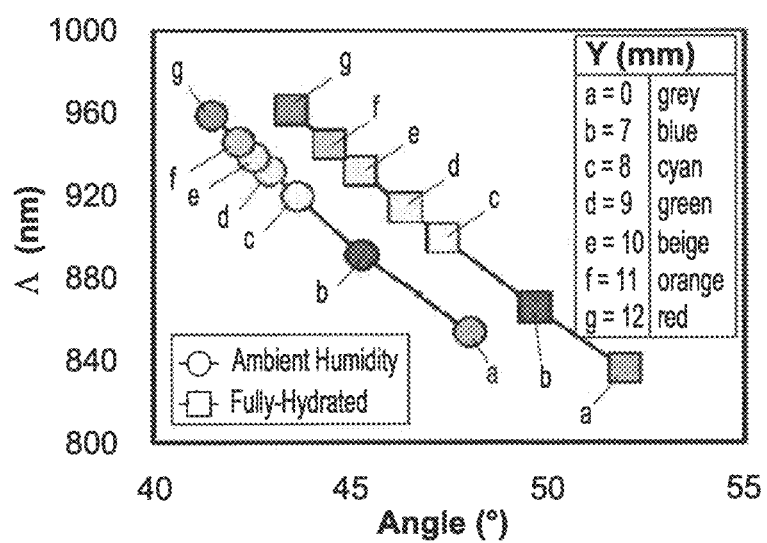
FIG. 9 is a graph showing the change in nanostructure spacing and the corresponding change in diffraction spot angle.
Figure 10:
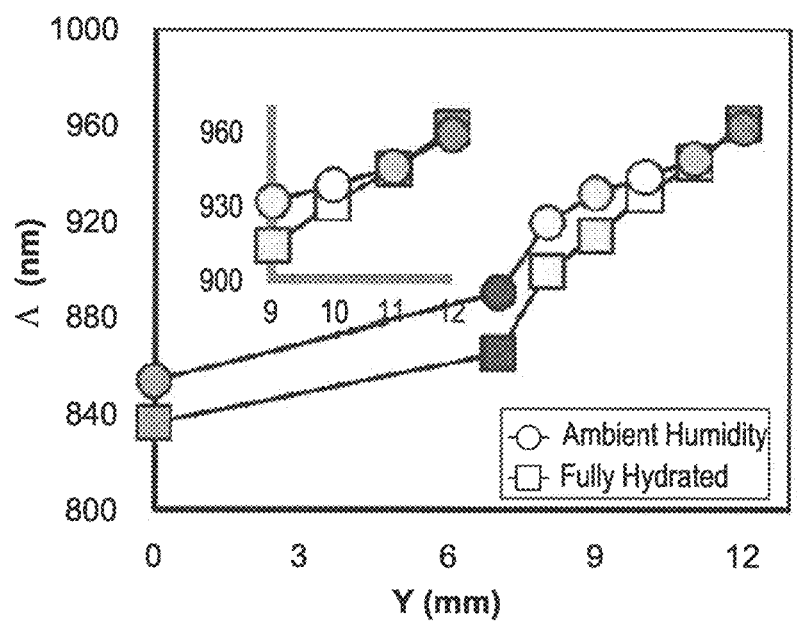
FIG. 10 is a graph of the bending distance change (change in distance Y) and the corresponding change in the spacing of the nanostructures of the nanostructured contact lens.

FIG. 6 shows a graph of the change in distance and the change in 1st order diffraction spot angle β of an exemplary nanostructured contact lens. The inset graph shows the relationship between the change in the horizontal distance X and the corresponding change in vertical distance Y. FIG. 7 is a graph showing the intensity increase with bending the contact lens in ambient humidity and fully-hydrated conditions (the inset is an enlargement of the data graphs between −50 and −40 degrees of diffraction). It can be seen that the intensity increases with an increase in bending (increase in distance Y). FIG. 8 is a graph of the bending distance change (change in distance Y) and the corresponding change in the diffraction spot angle of the nanostructured contact lens for both ambient humidity and fully hydrated conditions. FIG. 9 is a graph showing the change in nanostructure spacing and the corresponding change in diffraction spot angle. FIG. 10 is a graph of the bending distance change (change in distance Y) and the corresponding change in the spacing of the nanostructures of the nanostructured contact lens.

Figure 11:
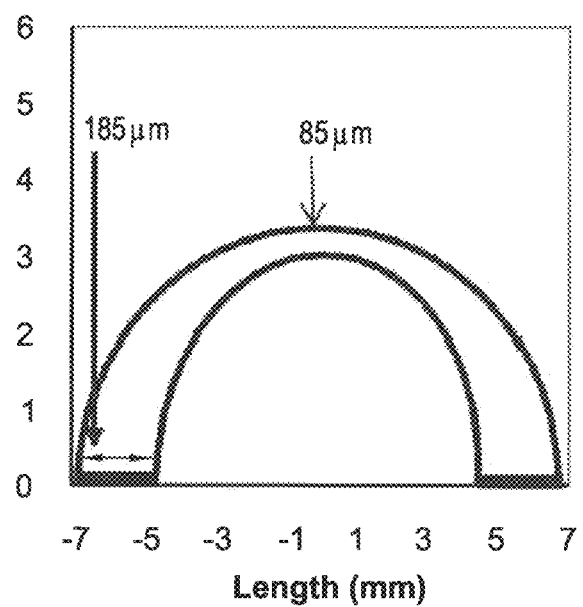
FIG. 11 is a diagram showing the geometry and thickness distribution of an exemplary nanostructured contact lens.
Figure 12:
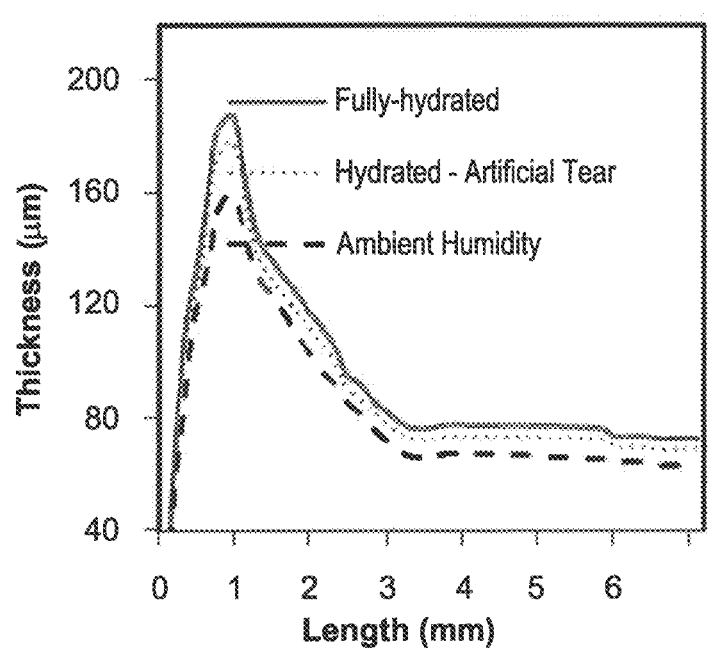
FIG. 12 is a graph of contact lens thickness variations from the edge (position 0) to the center (position 7) of an exemplary nanostructured contact lens.

FIG. 11 is a diagram showing the geometry and thickness distribution of an exemplary nanostructured contact lens. The diagram shows that the contact lens thickness thickness is about 185 μm near the outer edges (positions −7 mm and 7 mm for a 3.4 mm diameter contact lens), and tapers to about 85 μm near the center (position 0). FIG. 12 is a graph of contact lens thickness variations from the edge (position 0) to the center (position 7) of an exemplary nanostructured contact lens. Graphs of the thickness variation are shown for the contact lens in ambient humidity, hydrated (artificial tears), and fully hydrated conditions. It can be seen that the thickness increases with an increase in hydration.

Table 1 shows a comparison of lens roughness and water content for commercially available contact lenses.

TABLE 1

| Brand | Material | $R_{max}$ (nm) | $q_w$ (%) |
| --- | --- | --- | --- |
| Acuvue 2 | HEMA/MA | 17.4 | 58 |
| Acuvue Advance | Silicone hydrogel | 4.1 | 47 |
| Focus Dailies | PVA | 14.0 | 69 |
| Focus Night & Day | Silicone hydrogel | 40.9 | 24 |
| O2 Optix | Silicone hydrogel | 35.3 | 33 |
| Precision | VP/MMA | 13.4 | 74 |
| Purevision | Silicone hydrogel | 32.9 | 35 |
| SpofaLens | HEMA | 5.7 | 39 |

TABLE 1-continued

| Brand | Material | $R_{max}$ (nm) | $q_w$ (%) |
| --- | --- | --- | --- |
| Weicon | VP/MMA | 132.1 | 60 |
| W&V | HEMA | 120.4 | 39 |

As can be seen from Table 1, the maximum roughness $R_{max}$, varies from 4.1 nm to 132.1 nm, and the water contact $q_w$, varies from 24% to 74%.

Figure 13:
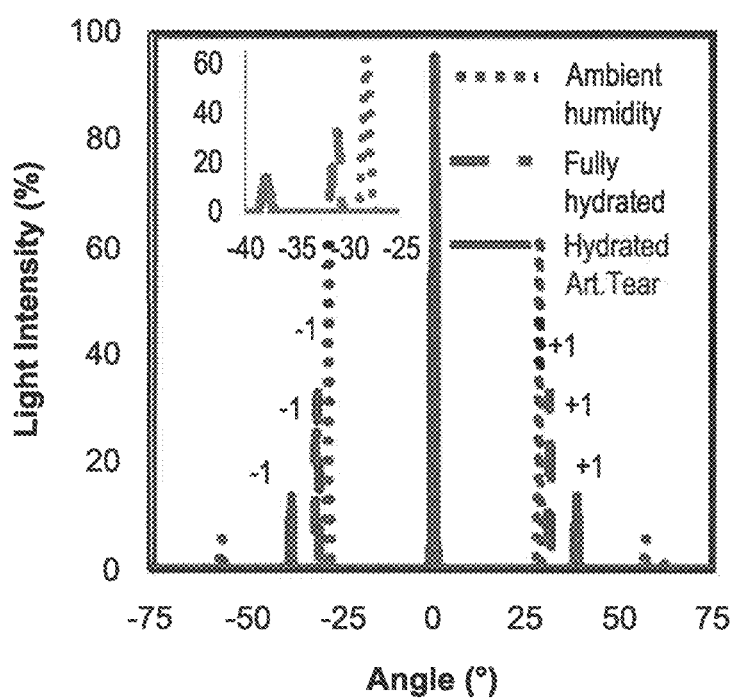
FIG. 13 is a graph of simulated diffraction results for gratings with a periodicity of Λ=925 nm on the contact lens surfaces for 450 nm wavelength light in ambient humidity, hydrated (artificial tears), and fully hydrated conditions.

FIG. 13 is a graph of simulated diffraction results for gratings with a periodicity of Λ=925 nm on the contact lens surfaces for 450 nm wavelength light in ambient humidity, hydrated (artificial tears), and fully hydrated conditions. The inset shows the expanded graphs from −40 degrees to −25 degrees. As can be seen from the graphs, the ambient humidity peak is at about −30 degrees, with the hydrated and fully hydrated peaks being shifted to higher diffraction angles.

Figure 14:
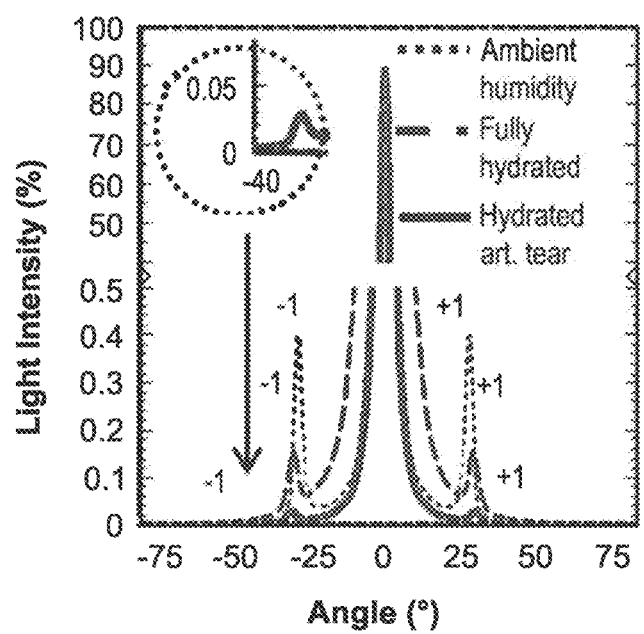
FIG. 14 is a graph of experimental diffraction results for gratings with a periodicity of Λ=925 nm on the contact lens surfaces for 450 nm wavelength light in ambient humidity, hydrated (artificial tears), and fully hydrated conditions.

FIG. 14 is a graph of experimental diffraction results for gratings with a periodicity of Λ=925 nm on the contact lens surfaces for 450 nm wavelength light in ambient humidity, hydrated (artificial tears), and fully hydrated conditions. The true values show a spreading of the peaks as compared to the simulated results. The inset shows the area just to the right of −40 degrees.

Figure 15:
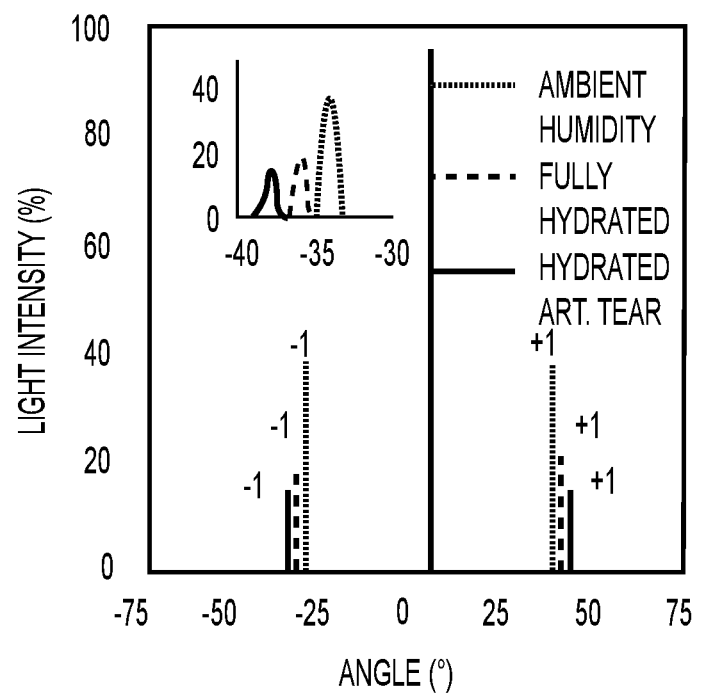
FIG. 15 is a graph of simulated diffraction results for gratings with a periodicity of Λ=925 nm on the contact lens surfaces for 532 nm wavelength light in ambient humidity, hydrated, and fully hydrated conditions.

FIG. 15 is a graph of simulated diffraction results for gratings with a periodicity of Λ=925 nm on the contact lens surfaces for 532 nm wavelength light in ambient humidity, hydrated, and fully hydrated conditions. The inset shows the expanded graphs from −40 degrees to −30 degrees. As can be seen from the graphs, the ambient humidity peak is at about −35 degrees, with the hydrated and fully hydrated peaks being shifted to higher diffraction angles.

Figure 16:
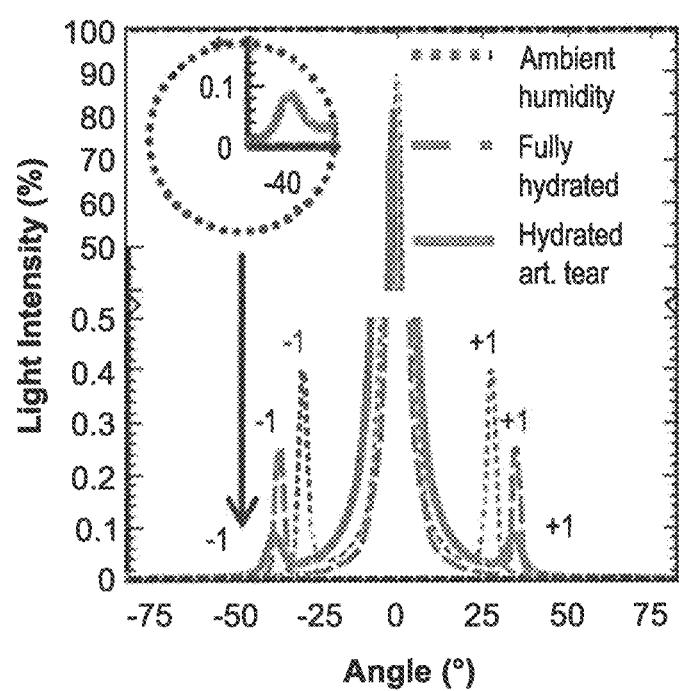
FIG. 16 is a graph of experimental diffraction results for gratings with a periodicity of Λ=925 nm on the contact lens surfaces for 532 nm wavelength light in ambient humidity, hydrated, and fully hydrated conditions.

FIG. 16 is a graph of experimental diffraction results for gratings with a periodicity of Λ=925 nm on contact lens surfaces for 532 nm wavelength light in ambient humidity, hydrated, and fully hydrated conditions. The inset shows the area just to the right of −40 degrees.

Figure 17:
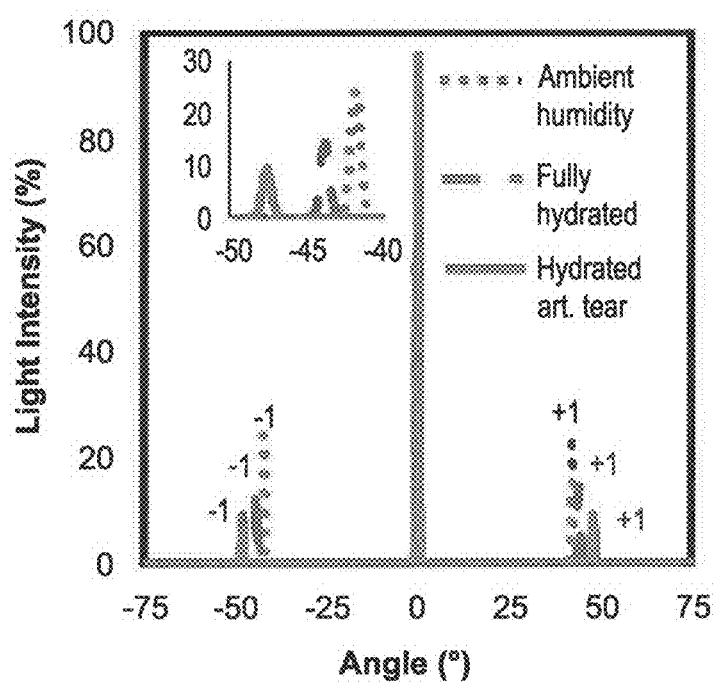
FIG. 17 is a graph of simulated diffraction results for gratings with a periodicity of Λ=925 nm on the contact lens surfaces for 635 nm wavelength light in ambient humidity, hydrated, and fully hydrated conditions.

FIG. 17 is a graph of simulated diffraction results for gratings with a periodicity of Λ=925 nm on the contact lens surfaces for 635 nm wavelength light in ambient humidity, hydrated, and fully hydrated conditions. The inset shows the expanded graphs from −50 degrees to −40 degrees. As can be seen from the graphs, the ambient humidity peak is at about −42 degrees, with the hydrated and fully hydrated peaks being shifted to higher diffraction angles.

Figure 18:
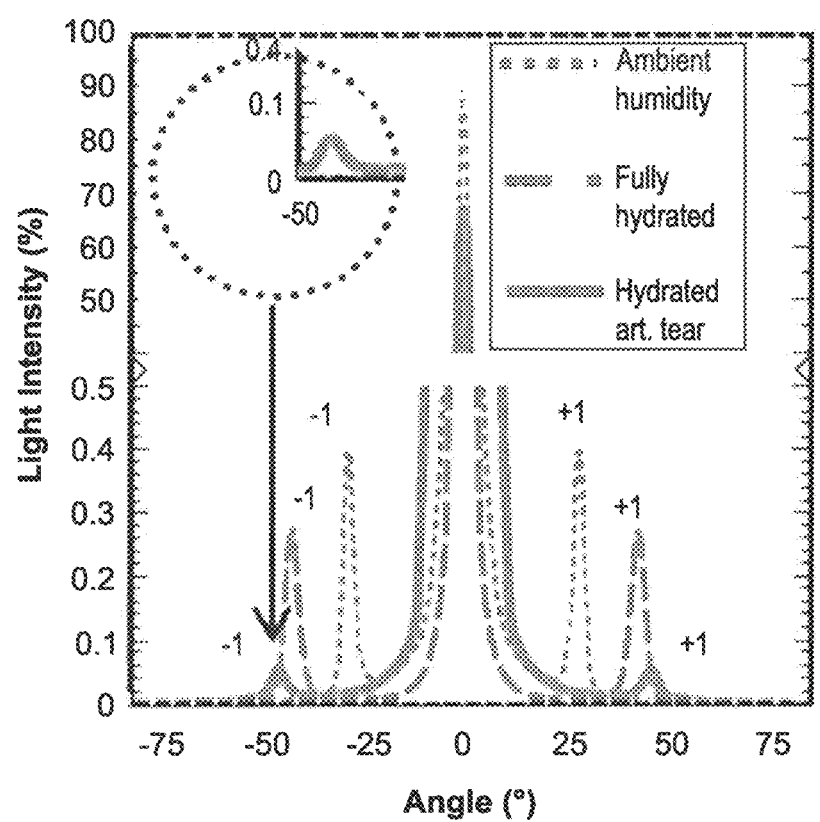
FIG. 18 is a graph of experimental diffraction results for gratings with a periodicity of Λ=925 nm on the contact lens surfaces for 635 nm wavelength light in ambient humidity, hydrated, and fully hydrated conditions.
Figure 19:
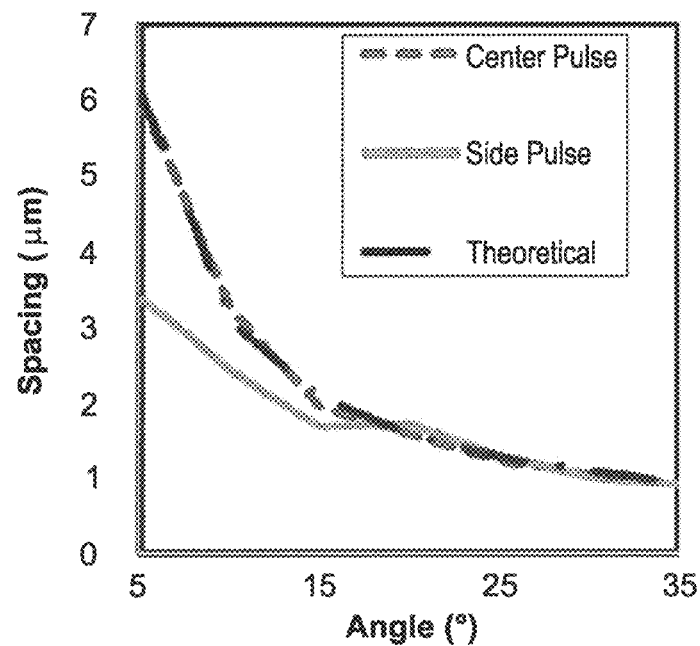
FIG. 19 is a graph of nanostructure spacing versus the tilt angle (angle θ) of the contact lens during production of the nanostructured contact lens.

FIG. 18 is a graph of experimental diffraction results for gratings with a periodicity of Λ=925 nm on the contact lens surfaces for 635 nm wavelength light in ambient humidity, hydrated, and fully hydrated conditions. The inset shows the area just to the right of −50 degrees, FIG. 19 is a graph of nanostructure spacing versus the tilt angle (angle θ) of the contact lens during production of the nanostructured contact lens. Data is shown for: nanostructures produced using center laser pulse of the first system 508, nanostructures produced using side laser pulse of the second system 520, and theoretical values. It can be seen that nanostructure spacing or spacing between nanostructures increases with a reduction in tilting angle θ, and that the center pulsed nanostructures data is consistent with the theoretical values.

Figure 20:
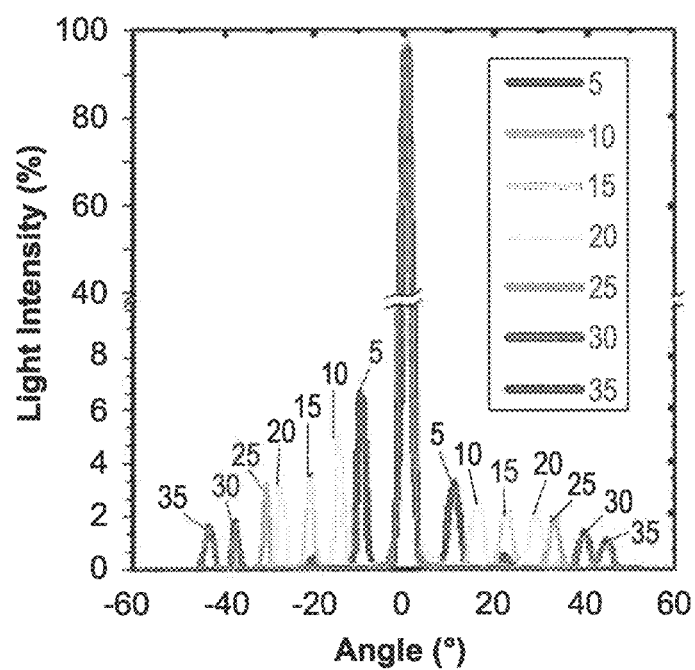
FIG. 20 is a diffraction analysis of nanostructures produced using side laser pulse of the second system 520. Data is provided for nanostructures produced at tilting angle θ of 5, 10, 15, 20, 25, 30, and 35°.

FIG. 20 is a diffraction analysis of nanostructures produced using side laser pulse of the second system 520. Data is provided for nanostructures produced at tilting angle θ of 5°, 10, 15, 20, 25, 30, and 35°. The data tends to indicate that an increase in the tilting angle θ results in an increase in the angle of diffraction.

Figure 21:
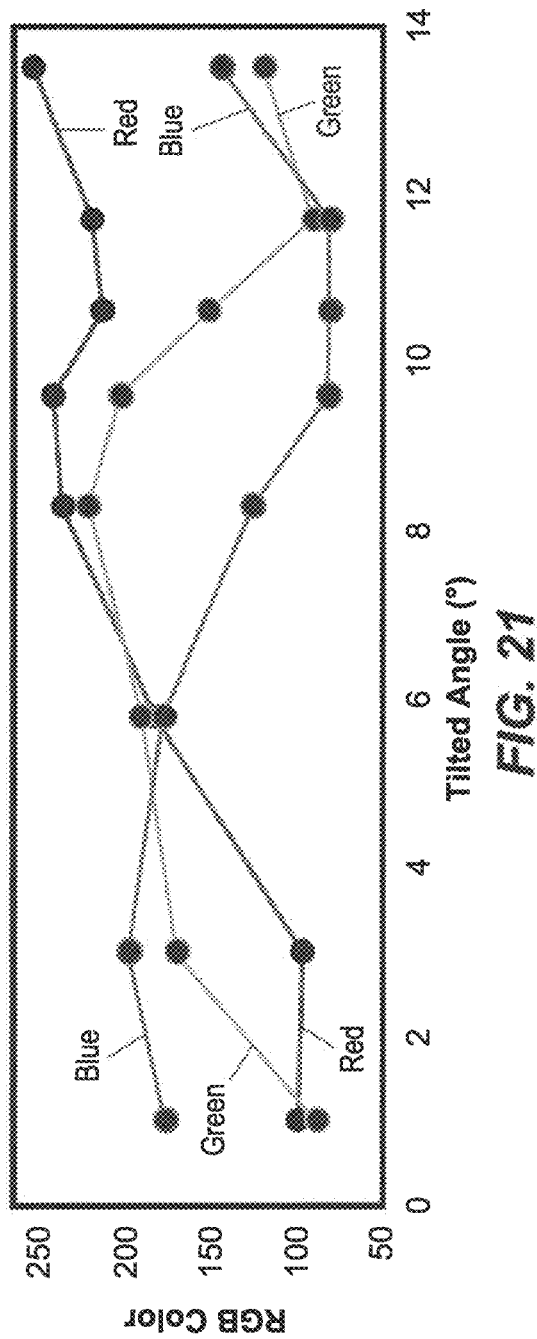
FIG. 21 is a graph of light intensity versus tilting angle θ of a 1D pattern nanostructure using a broadband white light source.

FIG. 21 is a graph of light intensity versus tilting angle θ of a 1D pattern nanostructure using a broadband white light source. Data is provided for nanostructures produced at tilting angle θ of between 1 and about 14 degrees and for red, green, and blue light.

Figure 22:
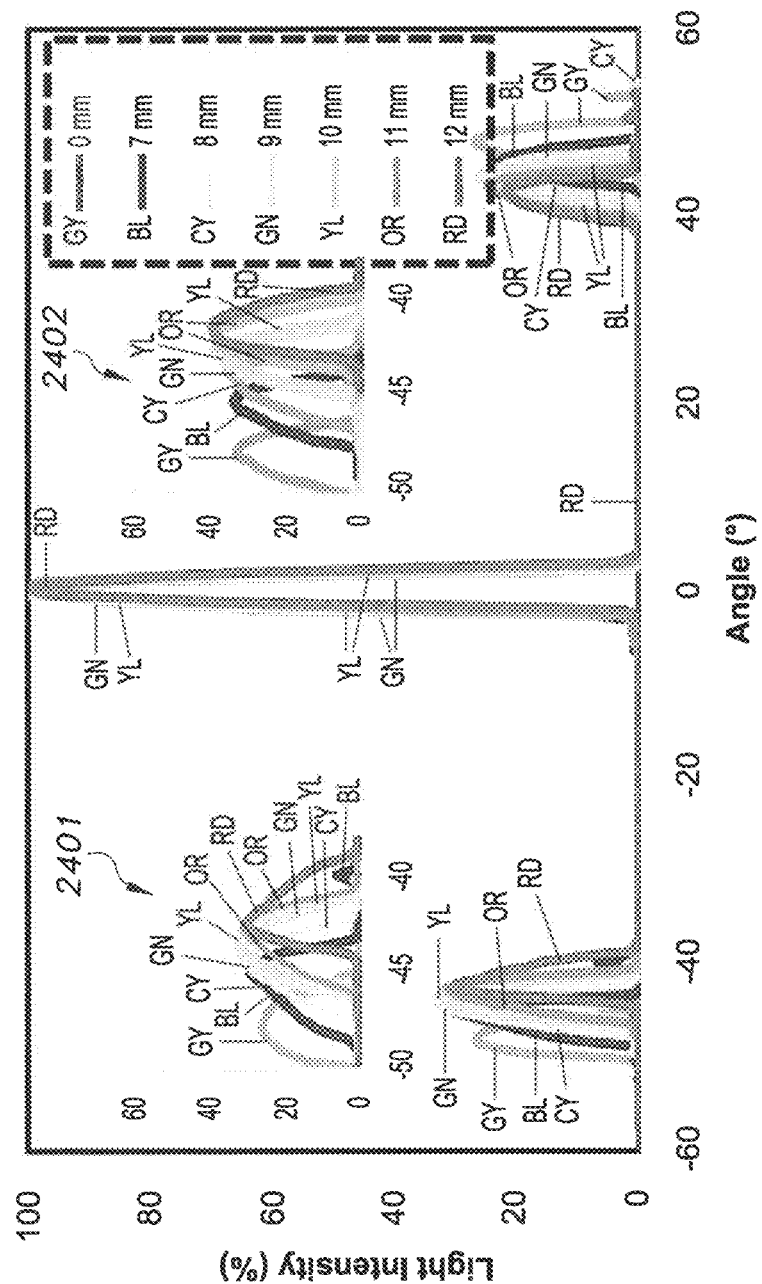
FIG. 22 is a graph of light intensity versus diffraction angle of 635 nm wavelength light on nanostructures.
Figure 23:
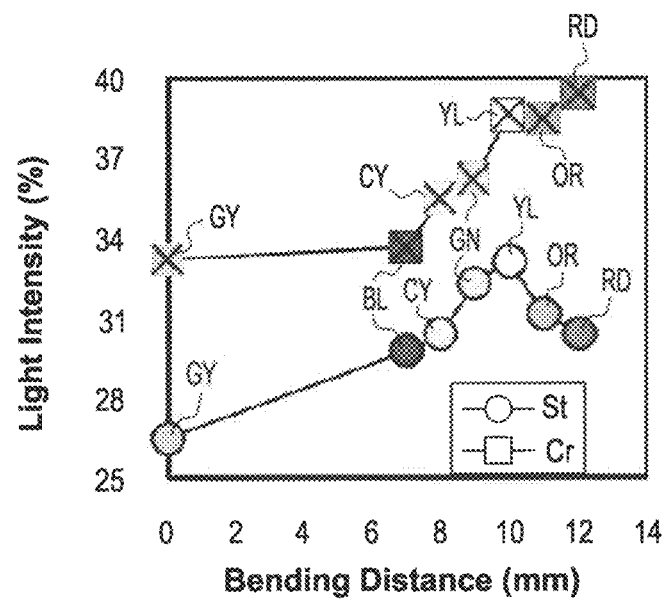
FIG. 23 is a graph showing light intensity versus bending distance for both straight and curved nanostructures.
Figure 24:
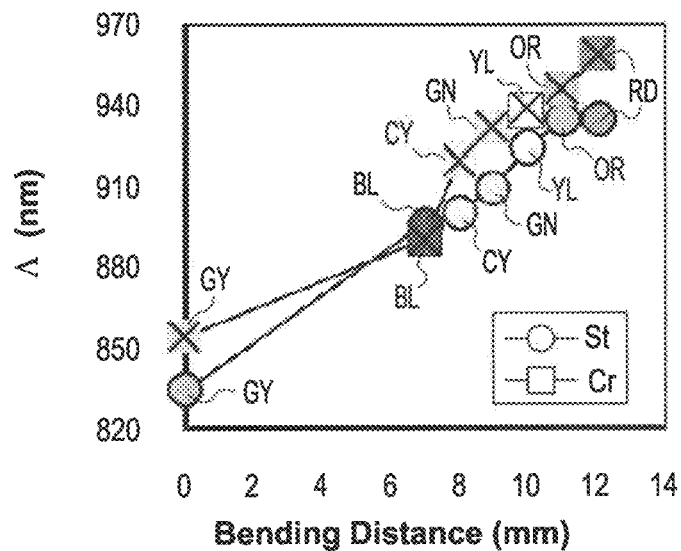
FIG. 24 is a graph showing nanostructure spacing versus bending distance for both straight and curved nanostructures.

FIG. 22 is a graph of light intensity versus diffraction angle of 635 nm wavelength light on nanostructures. Inset 2401 is a graph of the left side diffraction points for a straight nanostructure, while inset 2402 is a graph of the left side diffraction points for a curved nanostructure. FIG. 23 is a graph showing light intensity versus bending distance for both straight and curved nanostructures. FIG. 24 is a graph showing nanostructure spacing versus bending distance for both straight and curved nanostructures. As can be seen from the graphs, the diffraction angle decreases as intensity is increased. Similarly, the diffraction angle decreases as spacing between nanostructures increase.

Figure 25:
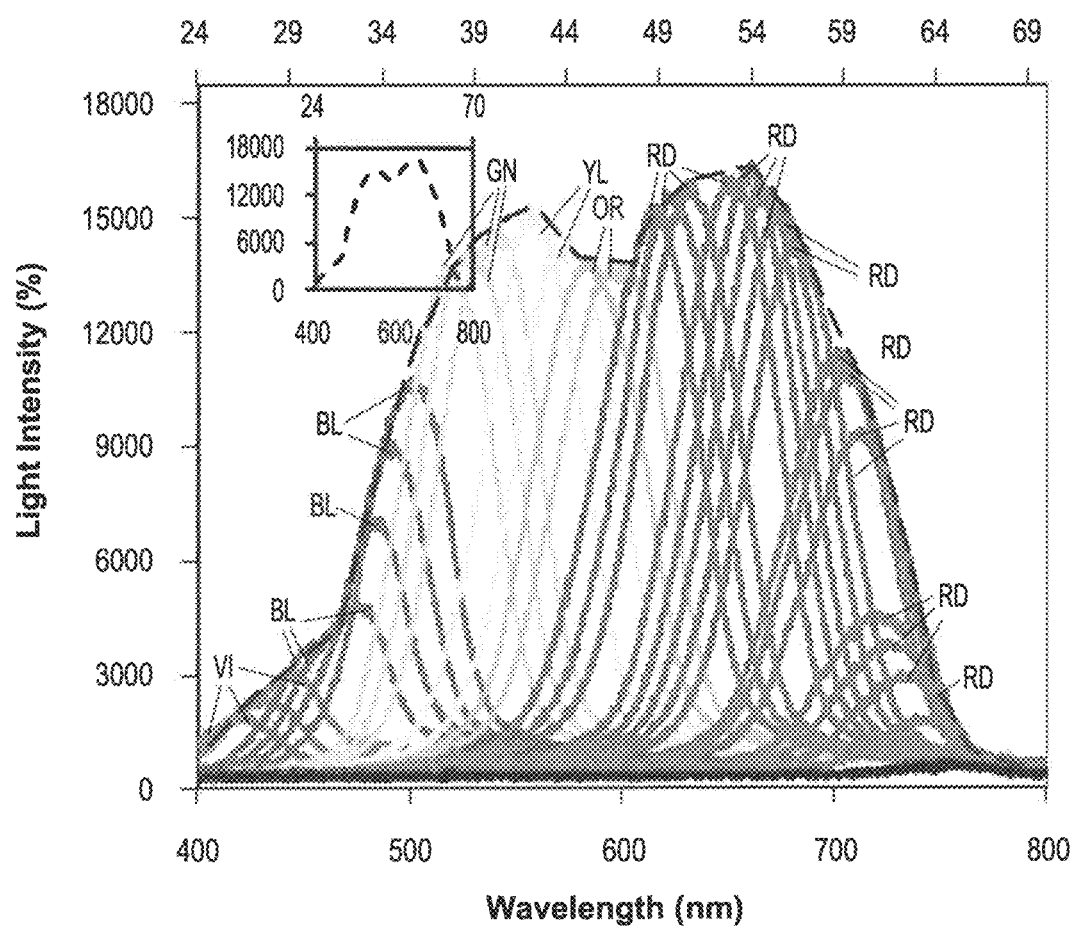
FIG. 25 is a graph showing angular measurements of the rainbow diffraction produced by a 1D nanostructured contact lens placed on a motorized stage in response to a broadband light beam passed therethrough.
Figure 26:
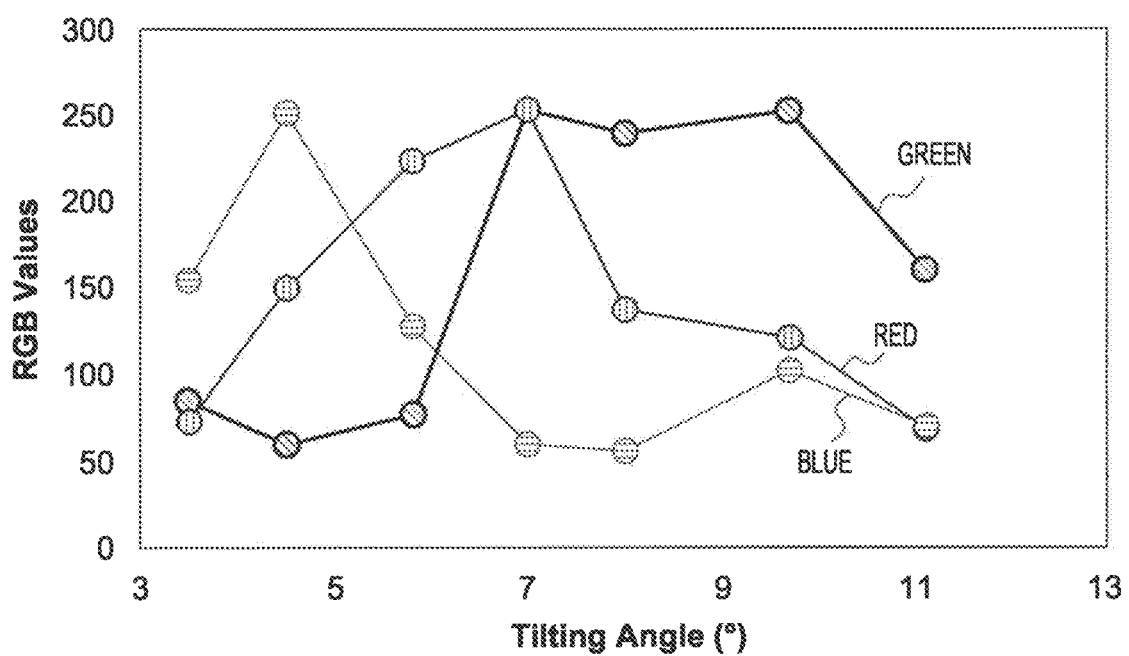
FIG. 26 is a graph showing curvature angle of the contact lens against RGB values.

In experiment, bending the nanostructured contact lens changed the reflected color from the curved nanostructures. Angular measurements of the rainbow diffraction produced by a 1D nanostructured contact lens placed on a motorized stage in response to a broadband light beam passed therethrough are provided in FIG. 25. The inset shows the overall intensity for all wavelengths. FIG. 26 is a graph showing curvature angle of the contact lens against RGB values.

Figure 27:
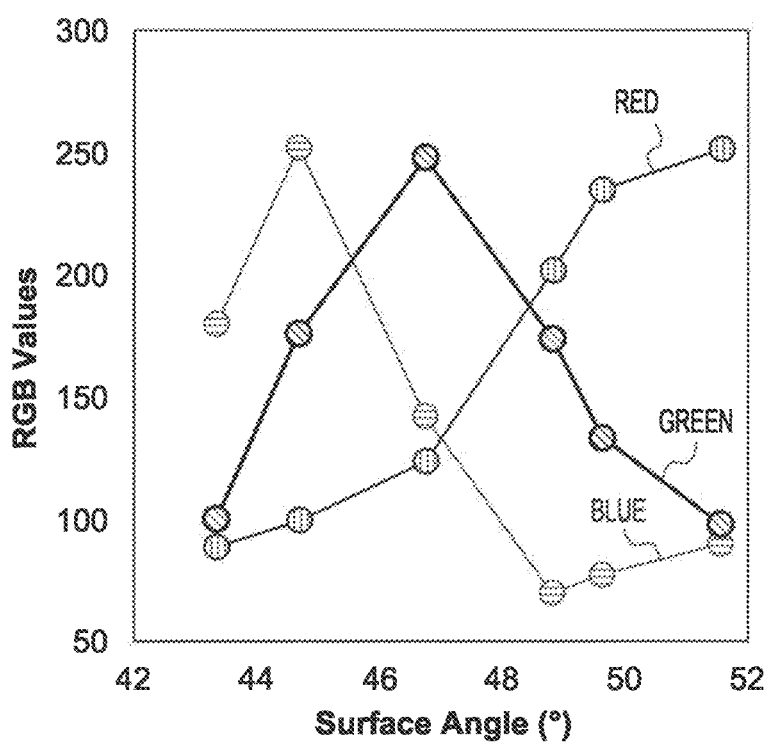
FIG. 27 is a graph of the surface angle of the nanostructured contact lens versus RGB values of the reflected light from the nanostructure.

It was further demonstrated that the nanostructured contact lens can be used to detect pressure changes in the eye. FIG. 27 is a graph of the surface angle of the nanostructured contact lens versus RGB values of the reflected light from the nanostructure.

Figure 28:
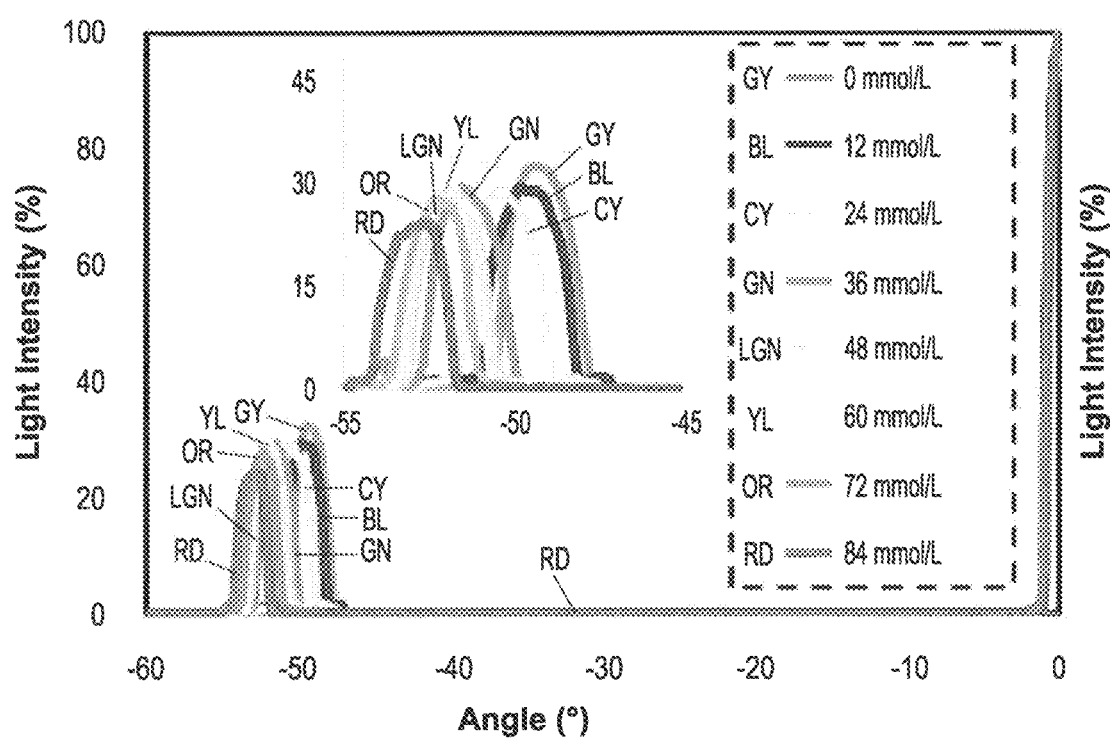
FIG. 28 is a graph showing diffraction angle measurements for the nanostructured contact lens at different $K^+$ ion concentrations.
Figure 29:
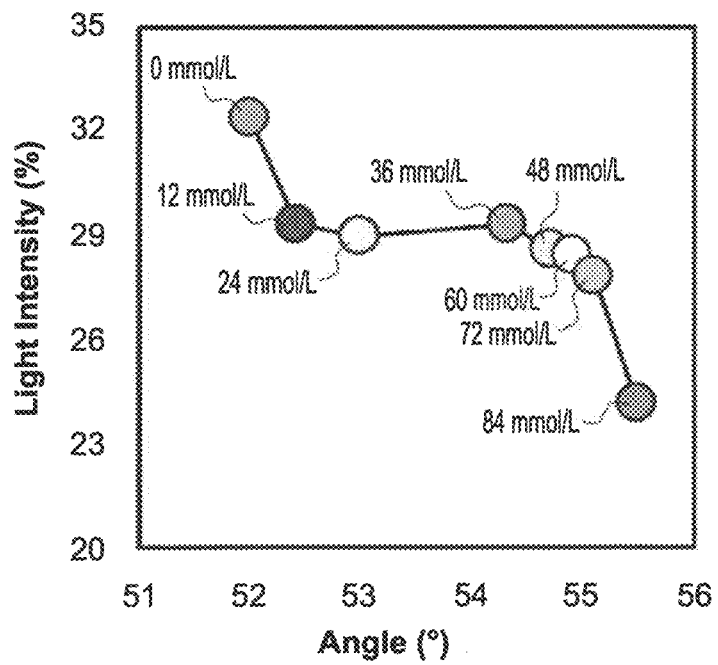
FIG. 29 is a graph of the diffraction angle of light from the nanostructured contact lens at different potassium ion concentrations versus light intensity.
Figure 30:
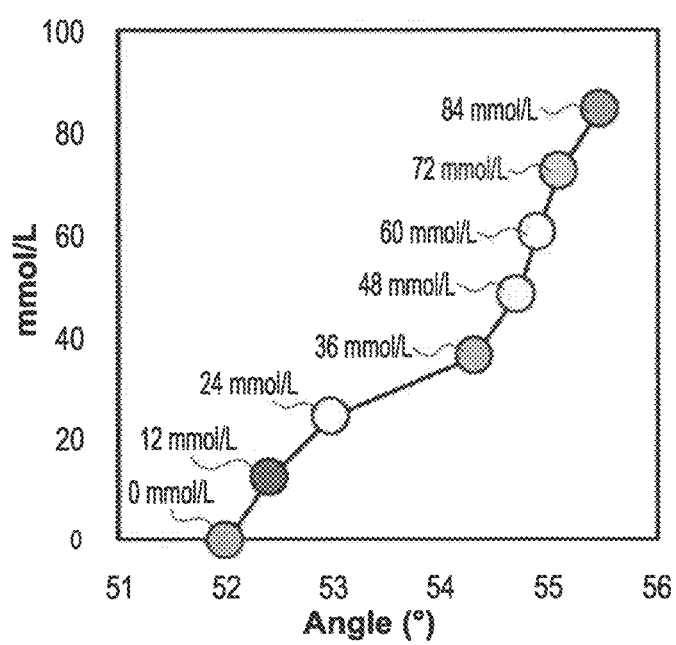
FIG. 30 is a graph of the diffraction angle of light from the nanostructured contact lens at different potassium ion concentrations.

Light diffraction of the nanostructured contact lens was further tested at different $K^+$ ion concentrations. FIG. 28 is a graph showing diffraction angle measurements for the nanostructured contact lens at different K ion concentrations. FIG. 29 is a graph of the diffraction angle of light from the nanostructured contact lens at different potassium ion concentrations versus light intensity. FIG. 30 is a graph of the diffraction angle of light from the nanostructured contact lens at different potassium ion concentrations. As can be seen from the graphs, intensity decreased with increased potassium ion concentration, while diffraction angles increased with increasing potassium ion concentration.

It is to be understood that the nanostructured contact lens system for monitoring ocular diseases is not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A contact lens system for monitoring ocular diseases, comprising:
    a contact lens having a first thickness at an inner most portion of the contact lens, a second thickness at an outer most portion of the contact lens, a third thickness at a mid-portion between the inner most portion and the outer most portion, and a plurality of curved nanostructures defined within the mid-portion, the third thickness being less than the second thickness and greater than the first thickness; and
    a handheld computer device having a camera and being configured to identify RGB colorimetric values from color shifts of optical reflection from the nanostructures and to correlate colorimetric values from color shifts of optical reflection over time with a physical surface curvature change of the contact lens.

2. The contact lens for monitoring ocular diseases as recited in claim 1, wherein the curved nanostructures include a nanopattern selected from a 1D nanopattern and a 2D nanopattern.

3. The contact lens for monitoring ocular diseases as recited in claim 1, wherein the curved nanostructures include a holographic nanopattern.

4. The contact lens for monitoring ocular diseases as recited in claim 1, wherein the first thickness is about 85 μm, the third thickness is about 120 μm, and the second thickness is about 185 μm.

5. The contact lens for monitoring ocular diseases as recited in claim 1, wherein the curved nanostructures have a size of about 840 nm.

6. A contact lens for monitoring ocular diseases, comprising:
    a lens having a first thickness at an inner most portion of the contact lens, a second thickness at an outer most portion of the contact lens, and a third thickness at a mid-portion between the inner most portion and the outer most portion, and a plurality of curved nanostructures defined within the mid-portion, the third thickness being less than the second thickness and greater than the first thickness;
    a light sensor;
    a microchip having a memory and a software application stored in the memory;
    a battery; and
    an illumination source directed towards a portion of the curved nanostructures and connected to the light sensor and the battery; wherein:
    the software application is configured to determine a diffraction angle of light passing through the curved nanostructures and received by the light sensor.

7. The contact lens system for monitoring ocular diseases as recited in claim 6, further comprising a handheld computer device for receiving the diffraction angle from the microchip.

8. The contact lens for monitoring ocular diseases as recited in claim 6, wherein the curved nanostructures include a nanopattern selected from a 1D nanopattern and a 2D nanopattern.

9. The contact lens for monitoring ocular diseases as recited in claim 6, wherein the curved nanostructures include a holographic nanopattern.

10. The contact lens for monitoring ocular diseases as recited in claim 6, wherein the first thickness is about 85 μm, the third thickness is about 120 μm, and the second thickness is about 185 μm.

11. The contact lens for monitoring ocular diseases as recited in claim 6, wherein the curved nanostructures have a size of about 840 nm.

12. A method for monitoring ocular diseases, comprising the steps of:
    providing a contact lens, the contact lens comprising:
        a lens having a first thickness at an inner most portion of the contact lens, a second thickness at an outer most portion of the contact lens, and a third thickness at a mid-portion between the inner most portion and the outer most portion, and a plurality of curved nanostructures defined within the mid-portion, the third thickness being less than the second thickness and greater than the first thickness;
        a light sensor;

a microchip having a memory and a software application stored in the memory;

a battery;

an illumination source directed towards a portion of the curved nanostructures and connected to the light sensor and the battery;

illuminating the curved nanostructures using the illumination source; and determining a diffraction angle of light passing through the curved nanostructures and received by the light sensor, whereby differences in diffraction angle over time can be correlated with at least one of a hydration level of the ocular surface and a potassium ion concentration at the ocular surface.

13. The method for monitoring ocular diseases as recited in claim 12, further comprising:

providing a handheld computer device for receiving the diffraction angle from the microchip.

* * * * *